(12) United States Patent
Karbowski

(10) Patent No.: US 9,532,517 B2
(45) Date of Patent: Jan. 3, 2017

(54) HYDROPONIC PLANT KIT

(71) Applicant: Innovations World Wide, LLC, Loxahatchee, FL (US)

(72) Inventor: Thomas G. Karbowski, Loxahatchee, FL (US)

(73) Assignee: Innovations World Wide, LLC, Loxahatchee, FL (US)

( * ) Notice: Subject to any disclaimer, the term of this patent is extended or adjusted under 35 U.S.C. 154(b) by 0 days.

(21) Appl. No.: 14/795,023

(22) Filed: Jul. 9, 2015

(65) Prior Publication Data
US 2016/0192606 A1 Jul. 7, 2016

Related U.S. Application Data

(60) Provisional application No. 62/099,751, filed on Jan. 5, 2015.

(51) Int. Cl.
*A01G 31/02* (2006.01)
*A01C 1/02* (2006.01)

(52) U.S. Cl.
CPC ............. *A01G 31/02* (2013.01); *A01C 1/02* (2013.01)

(58) Field of Classification Search
CPC ................................. A01G 31/02; A01C 1/02
USPC ................................................ 47/62 A, 62 R
See application file for complete search history.

(56) References Cited

U.S. PATENT DOCUMENTS

| | | | | |
|---|---|---|---|---|
| 435,211 A | * | 8/1890 | Darrah ................... | A01K 97/05 114/343 |
| 933,216 A | * | 9/1909 | Wilson ................... | A01K 97/05 119/65 |
| 1,419,549 A | * | 6/1922 | Fearnow ................ | A01K 63/02 114/343 |
| D77,225 S | * | 12/1928 | Danz ....................... | A01G 9/02 D6/514 |
| 2,572,763 A | * | 10/1951 | Robertson .............. | A01K 97/04 43/55 |
| 2,731,760 A | * | 1/1956 | Ebert ...................... | A01K 97/05 43/57 |

(Continued)

OTHER PUBLICATIONS www.ledgrowlight-hydro.com, "How to Grow Using Hydroponics", Internet Blog, Jun. 15, 2011.

(Continued)

*Primary Examiner* — Kristen C Hayes
*Assistant Examiner* — Ebony Evans
(74) *Attorney, Agent, or Firm* — McHale & Slavin, P.A.

(57) ABSTRACT

A self-contained hydroponic plant system which can be easily packaged as a kit containing a plurality of plant seeds, at least one plant cube for holding seedlings within, a germination tray to allow the plant cubes having seeds within to germinate, a vertically collapsible reservoir for holding water and nutrients therein having an open top end and a sealed bottom end, a solar powered aerator for circulating oxygen to the water in the reservoir through a flexible hose, and a net pot supported by the top end of the reservoir having a slotted bottom wall for supporting the plant cups with germinated seedlings within, whereby the plant's roots grow and access the plant nutrients within the aerated water-filled reservoir. The kit further includes a media to support/stabilize the plant cup within the net pot, a frame assembly sized to hold the reservoir, and support hangers to suspend the frame assembly and reservoir.

17 Claims, 8 Drawing Sheets

(56) References Cited

U.S. PATENT DOCUMENTS

| | | | | |
|---|---|---|---|---|
| 3,862,279 | A * | 1/1975 | Andersen, Sr. | B01F 3/04517 261/77 |
| 4,179,846 | A | 12/1979 | Carlisle | |
| 4,246,869 | A * | 1/1981 | Tobin, Jr. | A01K 39/012 119/57.8 |
| 4,255,896 | A | 3/1981 | Carl | |
| 4,315,380 | A * | 2/1982 | Davidson | A01C 1/00 435/818 |
| 4,329,812 | A | 5/1982 | Carlisle | |
| 4,380,296 | A * | 4/1983 | Murray | A47F 7/005 206/388 |
| 4,389,813 | A | 6/1983 | Jaques et al. | |
| 4,407,092 | A * | 10/1983 | Ware | A01G 31/02 47/64 |
| 4,565,159 | A * | 1/1986 | Sweeney | A01K 61/02 119/53 |
| 4,776,300 | A * | 10/1988 | Braddock | A01K 1/0125 119/168 |
| 4,896,452 | A * | 1/1990 | Smith | A01K 97/05 43/17.1 |
| 4,937,972 | A | 7/1990 | Freitus | |
| 4,996,792 | A | 3/1991 | Holtkamp, Sr. | |
| 5,020,273 | A * | 6/1991 | Johnson | A01C 1/02 47/61 |
| 5,033,411 | A * | 7/1991 | Brucker | A01K 39/012 119/52.2 |
| 5,065,702 | A * | 11/1991 | Hasiuk | A01K 1/0125 119/168 |
| 5,319,877 | A * | 6/1994 | Hagan | A01K 97/06 43/54.1 |
| 5,394,647 | A | 3/1995 | Blackford, Jr. | |
| 6,247,268 | B1 * | 6/2001 | Auer | A01G 31/02 47/62 A |
| 6,477,805 | B2 | 11/2002 | Ware | |
| 6,581,884 | B1 * | 6/2003 | Gretz | F16L 3/133 24/278 |
| 7,032,347 | B2 * | 4/2006 | Hartman | A47G 7/047 47/67 |
| 7,080,482 | B1 | 7/2006 | Bradley | |
| 8,256,380 | B2 * | 9/2012 | Bjornson | A01K 1/0125 119/168 |
| 2006/0016119 | A1 * | 1/2006 | Ashburn | A01K 97/05 43/56 |
| 2014/0075841 | A1 * | 3/2014 | Degraff | A01G 31/02 47/62 A |
| 2014/0290137 | A1 | 10/2014 | Nagels et al. | |

OTHER PUBLICATIONS http://www.ecochunk.com/author/, "Auxano Home Hydroponic System is for the Urban Gardener", Internet Article, Sep. 5, 2012.
David Kessler, "The Kratky Hydroponic Method: A Simple & Effective Hydroponic Technique", Internet Blog, Apr. 24, 2013.

* cited by examiner

HYDROPONIC PLANT KIT

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/099,751, entitled "Hydroponic Plant Kit", filed Jan. 5, 2015. The contents of the above referenced application is incorporated herein by reference in its entirety.

FIELD OF THE INVENTION

The present invention relates generally to plant growing, and more particularly, to a hydroponic plant growing kit.

BACKGROUND OF THE INVENTION

Gardening, the practice of growing and cultivating plants known as hydroculture, is a popular backyard activity among homeowners. Ornamental plants are often grown for their flowers, foliage, or overall appearance while other plants, such as root vegetables, leaf vegetables, fruits and herbs, are grown for consumption or for medicinal or cosmetic use. Gardening is considered to be a relaxing, pleasurable activity for many people. Until now, apartment and condominium dwellers, as well as the handicapped, young and elderly, were often denied the opportunity to experience the personal satisfaction inherent in planting, growing, and enjoying the results of their efforts.

Plant growing systems in the form of flower pots, which a person must water, are very well known. Automatic systems for watering plants are also well known. However, recent technology has advanced the art of hydroponics, a subset of hydroculture and method of growing plants using mineral nutrient solutions, in water, without soil. Use of this process enables apartment dwellers, condominium residents, handicapped people, young and the elderly to experience the satisfaction inherent in gardening. The plants can be grown solely in water with their roots suspended in the nutrient solution, in the air with the nutrient solution cascading among them, or in a growing medium that supports the roots while ensuring contact with the nutrient solution. The growing medium can be either man-made or organic, and can include various materials such as perlite, gravel, mineral wool, coconut husk, vermiculite, clay pellets, sand, moss, insulation, saw dust, lava rock and the like. Generally, the type of medium selected may be based on the amount of aeration and draining required for the plant during growth. The nutrient solution is typically circulated in order to maintain continuous or regular flow of the nutrient solution to the plant roots, and thereby contribute to optimal growing conditions for the plants.

There are distinct advantages to using various applications of hydroponics to grow plants. First, the water remains in the system as it is circulated, as opposed to the continual need to add water as required with soil planting, which can lead to substantial production cost savings. Plant yields are found to be higher and more uniform than with soil-planted plants, and, perhaps more importantly, the plants can be grown in areas where in-ground gardening or agriculture is not possible. Furthermore, diseases can often be more readily treated or addressed due to the ease of plant removal and washing, as well as the ease of changing the fluid which nourishes the plant.

As noted above, a key advantage to using hydroponics is space saving. Hydroponic growing normally utilizes small containers which take up much less space than the larger area required when growing a comparable amount of plants with soil-based agriculture. In other words, due to the continual delivery of nutrients to the roots in hydroponics, the amount of volume/area required is minimized. Using a hydroponic system, homeowners can improve plant production from the garden space available to them, and apartment/condominium dwellers that do not have access to soil are still afforded the experience of gardening.

A number of hydroponic planting methods have been developed that hold plants in place while suspending their roots directly in the nutrient solution. One such method is typically described as deep water culture. Deep water culture is a hydroponic method of plant production where the plant roots are suspended in a solution of nutrient-rich, oxygenated water. Traditional methods favor the use of plastic buckets with the plant contained in a net pot suspended from the center of the lid and the roots suspended in the nutrient solution. An air pump powered aquarium airstone oxygenates the nutrient solution. If sufficiently oxygenated, the plant roots can remain submerged indefinitely. Once the plants are ready to bloom, the level of the nutrient solution is gradually reduced to expose the roots to the air. Plants absorb more oxygen directly from the air than from the oxygen dissolved in water. Deep water culture allows plant roots to absorb large quantities of oxygen, while also allowing the intake of nutrients. This leads to rapid growth throughout the life of the plant.

For instance, U.S. Pat. No. 6,477,805 to Ware is an example of a conventional vertical hydroponic system including a nutrient supply module with one or more columns radially disposed about a central axis. The columns include a plurality of growth sites. U.S. Pat. No. 4,937,972 to Freitus discloses a self-contained plant growth system including a three-compartment plant growth chamber having an upper compartment for holding soil or vermiculite, an intermediate reservoir compartment for storing fluid (such as a plant growth solution), and a lower compartment housing a pump and electric power source. U.S. Pat. No. 4,255,896 to Carl teaches a hydroponic apparatus composed of a series of tubes that support a plurality of plants maintained in individual planting cups. Slot-like apertures permit the roots of the plant to extend within the tubes. Sterile liquid is isolated from the direct flow of the nutrient fluid. U.S. Pat. No. 5,394,647 to Blackford discloses a self-contained hydroponic plant growing system having a horizontal tubular chamber capped at each end, the chamber having a series of holes along its top for supporting a plurality of specially constructed flower pots or cups having holes in their bottoms to enable root growth outside of the pot or cup to access the plant nutrients, whereby a water pump, which can be solar powered, circulates water and other nutrients from a reservoir system through a spray means inside the tubular chamber based on a timer set to deliver the water and other nutrients at optimal times to maximize growth. U.S. Publication No. 2014/0290137 to Nagels et al. discloses a vertical indoor plant growing system including a base defining an interior compartment, a mast extending upwardly from the base, a first arm extending outwardly from the mast, a cable hanging downwardly from the first arm, one or more pots engaged on the cable, and a water delivery system connecting a water supply and the uppermost pot. U.S. Pat. No. 7,080,482 to Bradley teaches a modular plant growing apparatus utilizing a nutrient solution reservoir and a plant supporting structure comprising inner and outer walls. A pumping system delivers the nutrients to the plants within the structure.

Despite the availability of a wide variety of hydroponic planting units, they are mostly bulky, cumbersome, sold in individual parts, difficult to setup or use, and often not energy-efficient. There remains a need for a hydroponics planting system that can be easily transported and/or stored, requires minimal effort to setup, and is easy to use. The hydroponic planting system should be sold as a kit which includes every element needed to begin growing beautiful flowers, aromatic herbs and tasty veggies immediately. The hydroponic planting kit should be solar powered, thus allowing the kit to be assembled and used anywhere there is sunlight. Portions of the kit should be collapsible to allow compact storage and shipment. The compact configuration of the kit should also allow for retail sales as an end cap or shelf item without the need for large containers. Thus, what is lacking in the prior art is a virtually self-contained hydroponic planting kit having collapsible/expandable components, requiring only the occasional addition of water and/or other nutrients which may be used by individuals to grow a plurality of similar or different flowers, vegetables and other plants at an indoor or limited outdoor location.

SUMMARY OF THE INVENTION

A self-contained hydroponic plant system which can be easily packaged as a kit is disclosed. The hydroponic plant kit includes a plurality of plant seeds, at least one plant cube for holding the seedlings within, and a germination tray to allow the seed holding plant cubes to germinate for a period of time. Also included is a vertically collapsible tubular reservoir for holding water and nutrients with an open top end constructed and arranged to hold a net pot and a sealed bottom end, as well as a solar powered aerator for circulating oxygen to the water in the tubular reservoir by way of a flexible hose. The net pot has a slotted bottom wall for supporting plant cups with germinated seedlings therein, an open top, and a continuous sidewall with a plurality of slots, whereby the slots along the sidewall and bottom wall of the net pot allow the plant's roots to grow therethrough and access the plant nutrients in the aerated water-filled reservoir. The kit further includes media in the form of rocks to support/anchor the plant cup(s) within the net pot, a package of nutrient-rich food, a frame assembly sized to hold the reservoir, and support hangers to suspend the frame assembly and reservoir.

Accordingly, it is an objective of the present invention to provide a self-contained hydroponic plant kit that is a self-contained, easy to use, energy efficient, hassle-free, consumer friendly, and cost effective hydroponic plant growing system.

It is another objective of the present invention to provide a self-contained hydroponic plant kit which may be easily and efficiently manufactured and marketed.

It is a further objective of the present invention to provide a self-contained hydroponic plant kit which is of durable and reliable construction.

It is still a further objective of the present invention to provide a self-contained hydroponic plant kit in which the plant cups can contain similar or different consumable or flowering plants at the same time, such that a small diverse garden could be had using only the present invention on a window sill or the like.

Still a further objective of the present invention is to provide a self-contained hydroponic plant kit including a powering means, which may be solar powered, for circulating oxygen to the water within the reservoir. The solar powered aerator is connected to a porous air stone using a flexible hose. The air stone is placed within the tubular reservoir having one end of the flexible hose connected thereto and the opposite end connected to the solar powered aerator outside of the reservoir. Other powering means, including but not limited to battery operated, direct current, or the like, may be utilized without departing from the scope of the invention.

It is yet a further objective of the present invention to provide a self-contained hydroponic plant kit that includes a pack of nutrient-rich food to be dispersed within the water reservoir.

An even further objective of the present invention is to provide a self-contained hydroponic plant kit which includes a plurality of media in the form of rocks that can be used to support/stabilize the plant cups when placed within the net pot.

It is yet another objective of the present invention to provide a self-contained hydroponic plant kit having a tubular reservoir that collapses in an accordion-like fashion.

Still yet a further objective of the present invention is to provide an insulating neoprene wrap for the tubular reservoir for greater thermal efficiency.

It is still yet another objective of the present invention to provide a self-contained hydroponic plant kit including a frame assembly sized to hold the collapsible tubular reservoir and support hangers to suspend the frame assembly and reservoir in any place. The frame assembly includes an upper and lower frame having apertures to insert a plurality of support dowels. The support dowels have a length at least the length of the reservoir whereby the upper and lower frame members are placed on the bottom and open end of the reservoir and held in place by placing the support dowels within corresponding apertures.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
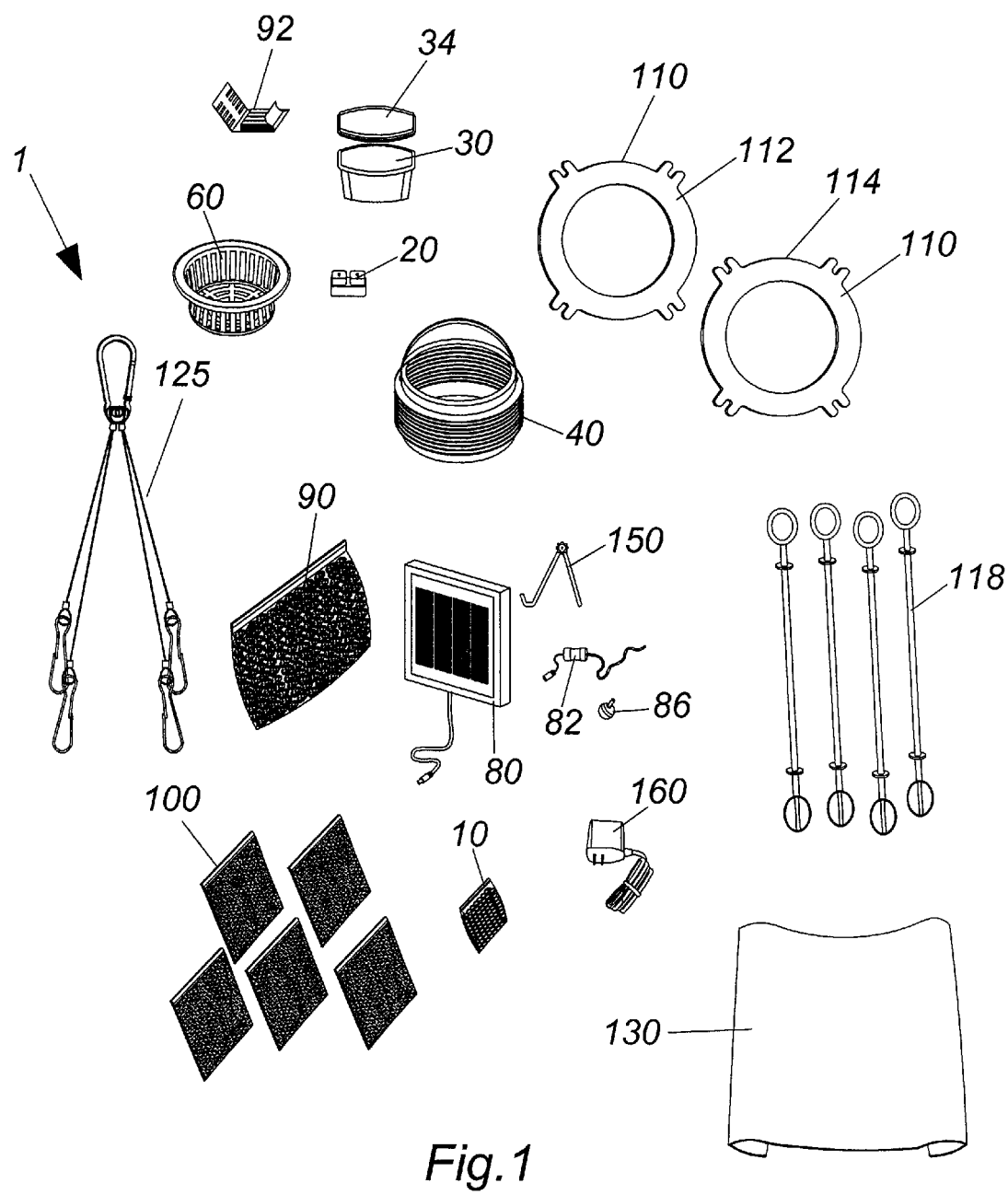
FIG. 1 is an exploded view of the hydroponic plant kit.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
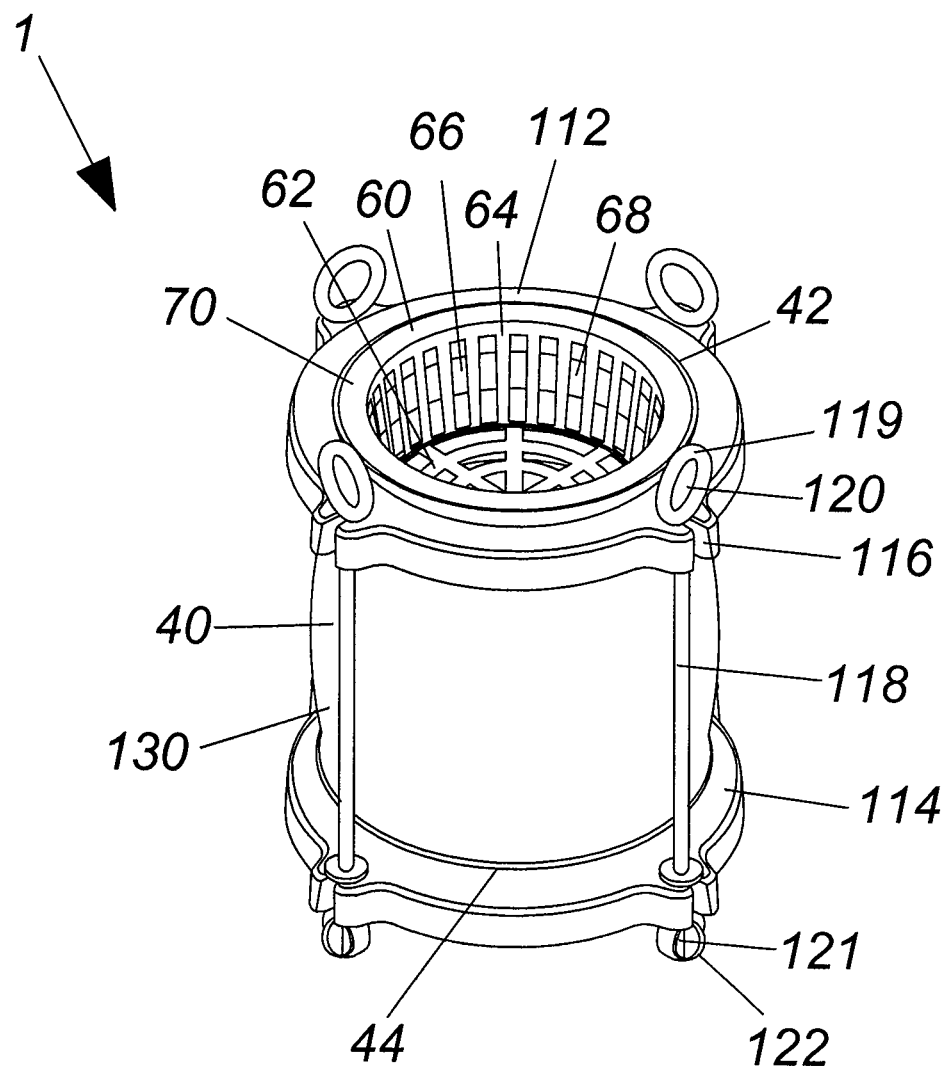
FIG. 2 is a perspective view of the assembled hydroponic plant kit.
Figure 8:
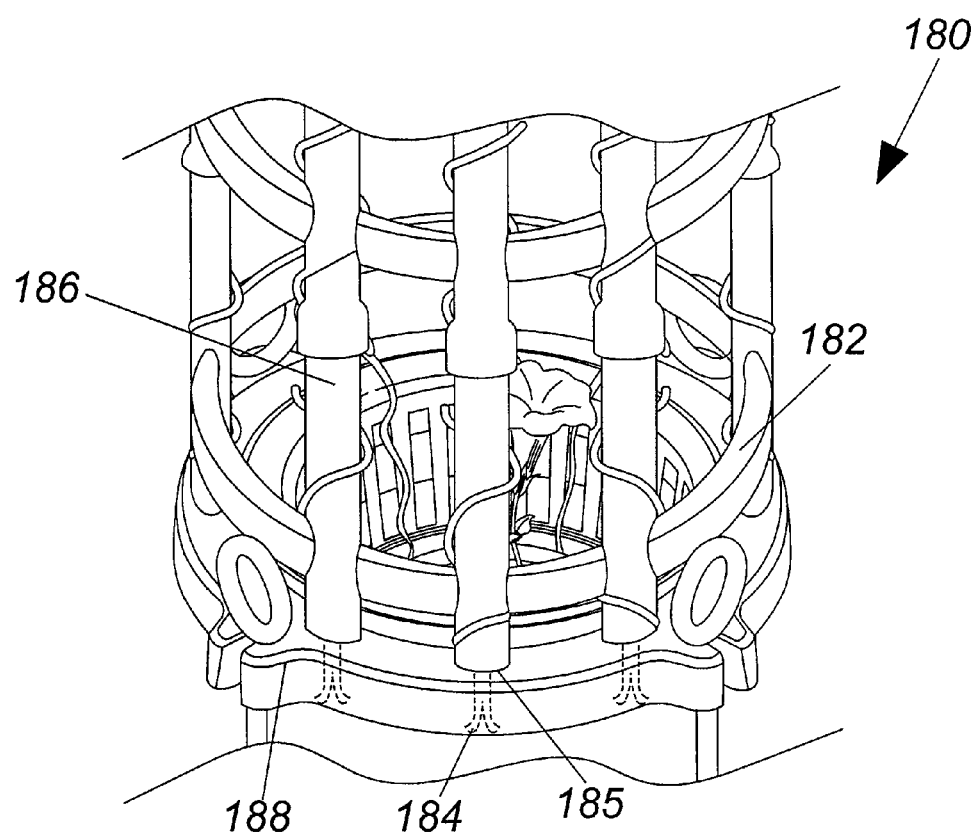
FIG. 8 is a perspective view of the trellis system of the instant invention.

As shown in FIGS. 1 and 2, a preferred embodiment of the self-contained hydroponic plant kit 1 includes a plurality of plant seeds 10, at least one plant cube 20 for holding the seeds 10, a germination tray 30 to allow the plant cubes 20 having seeds 10 to germinate for a period of time. Also included in the self-contained hydroponic plant kit 1 is a vertically collapsible tubular reservoir 40 for holding water and nutrients 100 therein having an open top end 42 constructed and arranged to hold a net pot 60, a sealed bottom end 44 and a solar powered aerator 80 for circulating oxygen to the water in the tubular reservoir 40 through a flexible hose 82 attached to an air stone 86. The net pot 60 has a slotted bottom wall 62 for supporting plant cubes 20 with germinated seeds 10, an open top 68, and continuous sidewall 64 with a plurality of slots 66, whereby the slots 66 along the sidewall 64 and bottom wall 62 of the net pot 60 allow the plant's roots to grow therethrough and access the plant nutrients within the aerated water-filled reservoir 40. The kit 1 further includes a plurality of rocks 90 to support the plant cube(s) 20 within the net pot 60, a package of nutrient-rich food 100, a frame assembly 110 sized to hold the reservoir 40, and support hangers 125 to suspend the frame assembly 110 and reservoir 40. The frame assembly 110 is sized to hold the collapsible tubular reservoir 40 and support hangers 120 to suspend the frame assembly 110 and reservoir 40 from an overhead or top surface. The frame assembly 110 is comprised of a top and bottom dowel housing, 112 and 114, constructed and arranged to hold the corresponding top end 42 and bottom end 44 of the reservoir 40; the upper and lower frame members, 112 and 114, also include apertures 116 to insert a plurality support dowels 118. The support dowels 118 have a length at least the length of the reservoir 40, whereby the upper and lower frame members, 112 and 114, are placed on the bottom end 44 and open end 42 of the reservoir 40 and held in place by placing the support dowels 118 within corresponding apertures 116. Additionally, the kit 1 includes an insulated neoprene wrap cover 130 for the tubular reservoir 40 for greater thermal efficiency and a stand 150 for holding the solar powered panel aerator 80 in place. The insulation 130 about the outside surface of the reservoir 40 helps maintain oxygenation. It is contemplated that the insulation 130 is constructed of neoprene; however, other materials may be considered. The neoprene wrap 130 encircles about the outside surface of the reservoir 40 and insulates the water therein to keep the temperature at or below room temperature, increasing oxygen or other gas content of the water within the reservoir 40. In alternative embodiments of the instant invention, it is contemplated that the kit 1 includes a trellis system 180 as shown in FIG. 8.

FIG. 1 shows the hydroponic plant kit 1 components individually and separably laid out. As shown, the hydroponic plant kit 1 can be easily packaged as a kit containing at least one plant cube 20, a plurality of plant seeds 10, a germination tray 30, a collapsible tubular reservoir 40, a net pot 60, a solar powered aerator 80, an optional power cord 160, an air stone 86, a plurality of rocks 90, a neoprene wrap 130, an aerator stand 150, a package of nutrient-rich food 100, PH papers 92, a frame assembly 110, and support hangers 125. The kit 1 is a self-contained, easy to use, energy efficient, hassle-free, consumer friendly, and cost effective hydroponic plant growing system. The kit 1 emphasizes portability and would be preferably sold in a plastic bag; however, any other suitable container can be used without departing from the scope of the invention.

Figure 3:
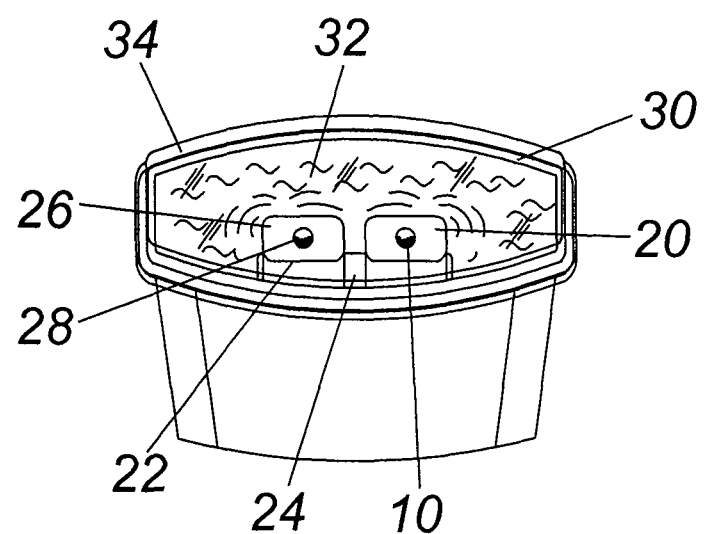
FIG. 3 is a perspective view of the instant invention in use during germination.

A variety of pre-packaged plant seeds 10 are included in the kit 1, ranging from, but not limited to, flowers, herbs, and vegetables. The plant cubes 20 are packaged as a set and each cube 20 is separable from each other. The plant cube 20 is constructed of a permeable material to allow water to penetrate within. As shown in FIG. 3, each plant cube 20 has four sidewalls 22, a bottom wall 24, and a top wall 26. The top wall 26 includes a bore 28 whereby seeds 10 can be placed within the bore. The germination tray 30 is a plastic container 32 sized to hold at least one set of plant cubes 20 and a matching air-tight lid 34. The plant cubes 20 are placed within the germination container 32 and submerged in water, and then the lid 34 is placed over the top of the tray until the seeds 10 begin to sprout in approximately 5-14 days. Prior to placing the plant cubes 20 in the germination tray 30, the plant cubes 20 should be submerged for approximately 30 seconds or until fully moist. Additionally, various species of seeds can be placed within the tray for germination. It should be noted that some seeds take longer to germinate than others depending on the type. Once the seeds 10 begin to germinate, the plant cubes 20 will be removed from the germination tray 30 and placed in the net pot 60 to begin the hydroponic process.

Figure 4:
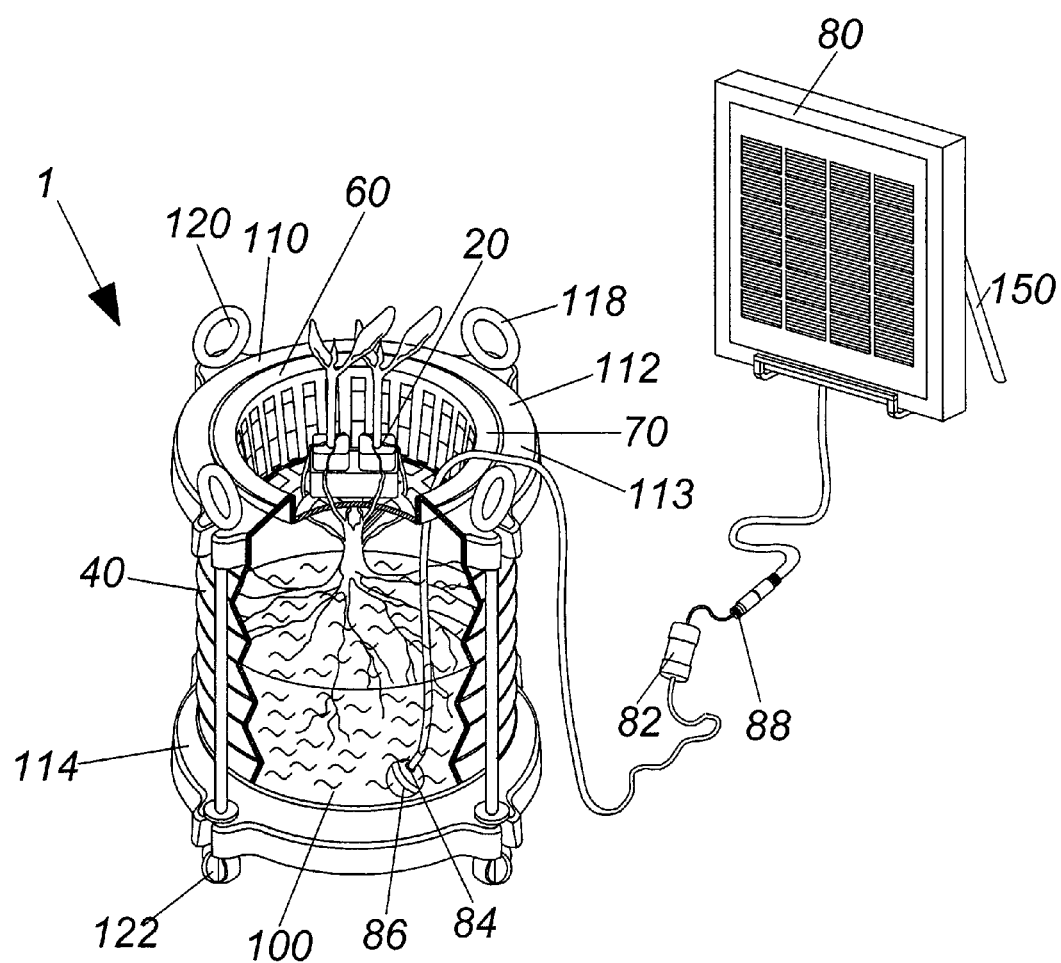
FIG. 4 is a cross-sectional view of the instant invention in use during vegetation.

As shown in FIG. 4 during the vegetation process, the collapsible tubular reservoir 40 is fully extended in an open position and warm water is poured into the reservoir 40. Thereafter, a suitable amount of nutrient-rich food 100 is also poured into the reservoir 40 and mixed together until the granules are fully dissolved (the user may use a mixing spoon to stir and dissolve the granules). Then, one end 84 of the flexible hose 82 is connected to the air stone 86 and placed within the reservoir 40, then the second end 88 of the flexible hose 82 is fed through a slot 66 in the sidewall 64 of the net pot 60 and connected to the solar powered aerator 80, which is positioned outside of the reservoir 40. Next, the net pot 60 is placed on the top portion 50 of the reservoir 40. The top lip 70 of the net pot 60 is supported along the top portion 50 of the reservoir 40. Then, the germinated plant cubes 20 are placed within the net pot 60. A plurality of support rocks 90 can be placed beside the plant cubes 20 for support, especially when the plants grow in size. The aerator 80 is then powered on and the hydroponic process begins. The user must monitor the water level within the reservoir 40 to ensure that the roots from the seeds 10 are at least partially submerged in water, and the user should change the nutrient-rich food solution 100 every 3-4 weeks to ensure optimal results.

A pre-packaged amount of nutrient-rich plant food 100 is also included in the kit 1. The plant food 100 is poured into the reservoir 40 and manually mixed until dissolved. When the aerator 80 is put into use, the nutrient plant food 100 are circulated within the reservoir 40, thereby maintaining a continuous or regular flow of the nutrient plant food 100 to the plant roots and contributing to optimal growing conditions for the plants. Also included is a media in the form of a plurality of rocks 90 that can be used to support/stabilize the plant cubes 20 when placed within the net pot 60. The rocks 90 add stability to the plant cubes 20, specifically when the plants begin to grow larger in size. Additionally, the hydroponic plant kit 1 includes a solar powered aerator 80 for circulating oxygen to the water within the reservoir 40. The solar powered aerator 80 is connected to an air stone 86 using a flexible hose 82. The air stone 86 is placed within the tubular reservoir 40 having one end 84 of the flexible hose 82 connected thereto and the opposite end 88 connected to the solar powered aerator 80 outside of the reservoir 40. The aerator 80 is positioned outside of the reservoir 40 and near sunlight in order to provide continuous oxygen to the water. The solar powered aerator 80 includes a one way valve, not shown, which prevents water from entering therein. The solar powered aerator 80 can be mounted on the stand 150 provided. Additionally, not shown, it is contemplated the solar powered aerorator can have a concave solar panel to catch sunlight throughout the day.

Figure 5:
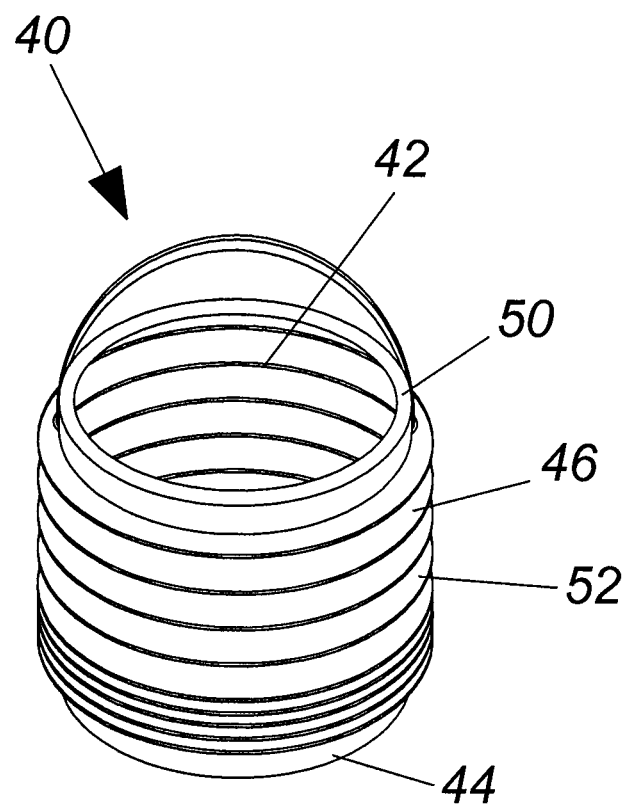
FIG. 5 is a perspective view of the collapsible tubular reservoir of the instant invention.

As shown in FIG. 5, the collapsible tubular reservoir 40 is comprised of an open top end 42 for supporting a net pot 60, a sealed bottom end 44, and a continuous sidewall 46. Along the top portion 50 of the sidewall 46 is an aperture, not shown, sized to allow a flexible hose 82 to pass therethrough. The sidewall 46 is formed from multiple accordion pleats 52 that allow the tubular reservoir 40 to collapse and extend vertically. The tubular reservoir 40 collapses (shown in FIG. 1) and extends (shown in FIG. 2) in an accordion-like fashion, to minimize size when packaged. It is contemplated that the tubular reservoir 40 collapses down to approximately two and a half inches tall. The reservoir 40 is preferably constructed of plastic resin, however, other like materials are contemplated.

Figure 6:
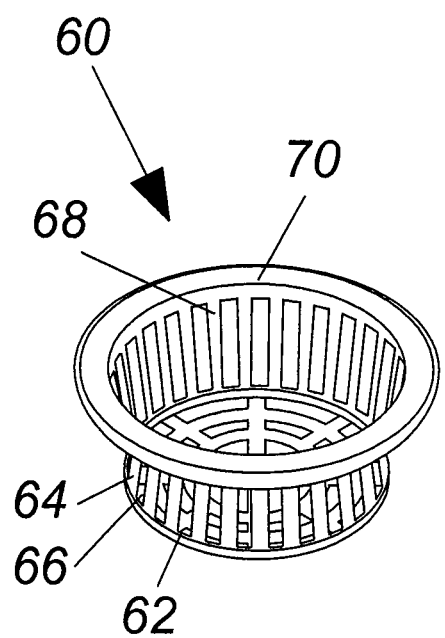
FIG. 6 is a perspective view of the net pot of the instant invention.
Figure 7:
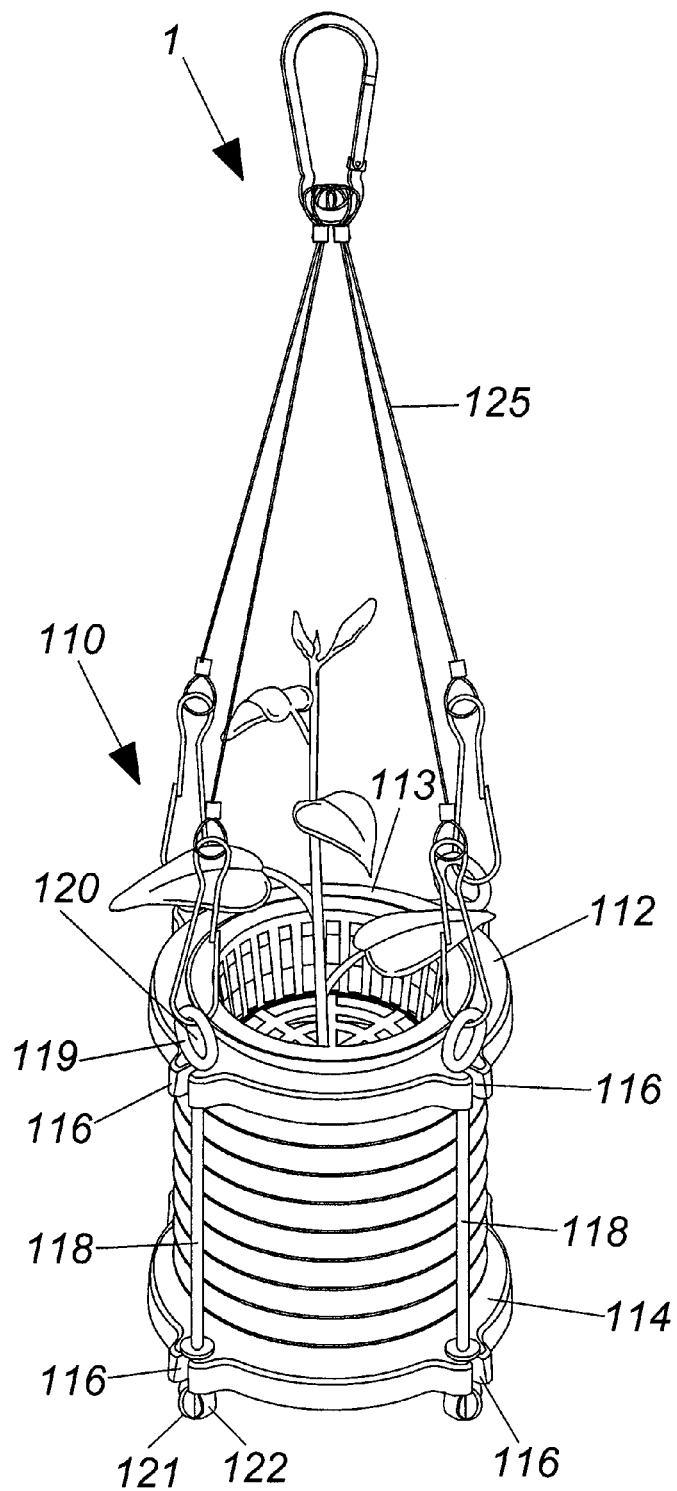
FIG. 7 is a perspective view of the frame assembly of the instant invention.

As shown in FIGS. 4 and 7, the net pot 60 is supported by the open top end 50 of the reservoir 40 along the top lip 70 thereof. Seen in FIG. 6, the net pot 60 includes a slotted bottom wall 62 for supporting at least one plant cube 20 with germinated seeds 10 within, an open top 68 having a continuous top lip 70, and a continuous sidewall 64 with a plurality of slots 66. The slots 66 along the sidewall 64 and bottom wall 62 of the net pot 60 allow the plant's roots to grow therethrough and access the plant nutrients within the aerated water-filled reservoir 40. The net pot 60 is sized to fit within the top end opening 42 of the reservoir 40.

A frame assembly 110 constructed and arranged to hold the collapsible tubular reservoir 40 is shown in FIG. 7. The frame assembly 110 is comprised of a top dowel housing 112, a bottom dowel housing 114, and at least two dowels 118. As shown, the top and bottom housing, 112 and 114, have a similar construction. The top and bottom dowel housing, 112 and 114, have an open ring construction sized to receive the top end or bottom end, 42 and 44, respectively, of the tubular reservoir 40. On the outside edge of the dowel housings are snap-fit apertures 116 sized to accept a dowel 118. The top dowel housing 112 is also constructed to receive the net pot 60. Each dowel 118 has a top end 119 and bottom end 121. The top end 119 has an opening 120 and the bottom end 121 has a foot support 122. The dowel 118 is sized to snap into the snap-fit aperture 116 on the top and bottom dowel housing, 112 and 114. When assembled, the bottom dowel housing 114 is placed on a flat surface, then the bottom end 44 of the expanded insulated tubular reservoir 40 is placed within the bottom dowel housing 114, then the top dowel housing 112 is placed over top the top end 42 of the tubular reservoir 40, then each dowel 118 is snapped into place within the corresponding snap-fit apertures 116 on the top and bottom dowel housing, 112 and 114, lastly the net pot 60 is placed on the top surface 113 of the top dowel housing 112. Using this construction, the net pot 60 rests on the top dowel housing 112 and not the tubular reservoir 40, as the lip 70 on the net pot 60 is resting on the top surface 113 of the top dowel housing 112; however, the net pot 60 can rest on the open top of the reservoir instead of the top dowel housing, not shown. The frame assembly 110 further includes support hangers 125 connectable thereto for hanging the tubular reservoir from an overhead surface. The frame assembly 110 is not limited to this construction; other embodiments for a frame assembly capable of holding the tubular reservoir are contemplated. The hangers 125 are used to suspend the frame 110 and reservoir 40 in a desirable location, preferably near sunlight so as to power the solar powered aerator 80.

In an alternative embodiment of the instant invention, shown in FIG. 8, the self-contained hydroponic plant kit 1 includes a trellis system 180. The trellis system 180 is an open framework or lattice 182 of interwoven or intersecting pieces of material, such as, but not limited to, wood, bamboo, plastic, or metal that support and display climbing plants. The trellis system 180 is attachable to the top surface 113 of the top dowel housing 112 using snap-fit fasteners 184. The lattice 182 is preferably constructed of a flexible material such as plastic so it may have a circular cross-section similar to the circular shape of the top dowel housing 112. The lattice 182 includes a top end 186 and bottom end 188. The bottom end 188 includes a plurality of male snap-fit fasteners 184 and the top surface 113 of the top dowel housing 112 includes a plurality of snap-fit openings defined as the female end of the snap-fit fasteners 185. The bottom end 188 of the lattice 182 attaches to the top dowel housing 112 to form a vertical trellis system whereby plants may attach thereto. Additionally, it is contemplated the kit 1 includes a flex arm for mounting the solar panel thereon, not shown. The flex arm allows for positioning and adjusting the solar panel with ease.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self-contained hydroponic plant growing kit comprising:
   a vertically collapsible tubular reservoir having an open top end, a side wall, and a sealed bottom end, said side wall having a first collapsed position for shipping whereby said side wall is less than half as tall as said side wall in an expanded position, said expanded position for use in said self-contained hydroponic plant growing kit, said sealed bottom end adapted for holding water and nutrients;

a frame assembly sized to support said vertically collapsible tubular reservoir in said expanded position, said frame assembly including an upper frame member sized to secure to said open top end of said reservoir and a lower frame member sized to secure to said sealed bottom end of said reservoir, said upper and lower frame members further include a plurality of apertures, a plurality of support dowels, each of said plurality of apertures sized for accepting a corresponding support dowel, said plurality of support dowels each having a length of at least a length of said vertically collapsible tubular reservoir in said expanded position, each of said plurality of support dowels including a top end, said top end including a ring and a bottom end having a support member, said ring constructed and arranged for supporting said vertically collapsible tubular reservoir from an overhead surface, said bottom end support member constructed and arranged to support said vertically collapsible tubular reservoir upon a top surface;

an aerator in the form of an air pump, said aerator collecting air from the atmosphere and pressurizing said air for delivery to said water contained within said tubular reservoir by way of a flexible hose;

a net pot having a slotted bottom wall for supporting germinated seedlings therein, an open top, and a sidewall with a plurality of slots, a flange extending around said open top, said flange constructed and arranged to support said net pot at said open top end of said vertically collapsible tubular reservoir, said slots sized to allow a plant's roots to grow therethrough, whereby said plant roots can access said water and nutrients in said sealed bottom end of said vertically tubular collapsible reservoir.

2. The self-contained hydroponic plant growing kit of claim 1, including a solar panel, said solar panel sized for operation of said aerator.

3. The self-contained hydroponic plant growing kit of claim 1, wherein said vertically collapsible tubular reservoir includes an insulating wrap, said insulating wrap being formed from a flexible material and sized for circumscribing said vertically collapsible tubular reservoir while said vertically collapsible tubular reservoir is in said expanded position.

4. The self-contained hydroponic plant growing kit of claim 1, including a package of nutrient-rich food for mixing with water in said sealed bottom end.

5. The self-contained hydroponic plant growing kit of claim 1, including a plurality of plant seeds, and at least one plant cube for holding said plurality of plant seeds for germination, and a germination tray, said germination tray having a bottom portion and a translucent top portion, said translucent top portion being securable to said bottom portion, said bottom portion having a cavity sized to contain said at least one plant cube and said plurality of plant seeds.

6. The self-contained hydroponic plant growing kit of claim 5, including media in the form of rocks to support/anchor said at least one plant cube within said net pot.

7. A self-contained hydroponic plant growing kit comprising:

a vertically collapsible tubular reservoir having an open top end, a side wall, and a sealed bottom end, said side wall having a first collapsed position for shipping whereby said side wall is less than half as tall as said side wall in an expanded position, said expanded position for use in said self-contained hydroponic plant growing kit, said sealed bottom end adapted for holding water and nutrients;

an upper frame member sized to secure to said open top end of said reservoir and a lower frame member sized to secure to said sealed bottom end of said reservoir, said upper and lower frame members each having a plurality of U-shaped openings, whereby a corresponding support dowel is positionable into the open side of said U-shaped opening, each said support dowel including a first and a second support member positioned in a spaced apart arrangement along the length of each said dowel, said first said support member constructed and arranged to cooperate with a said upper frame member and said second support member constructed and arranged to cooperate with said lower frame member for positioning said upper and said lower frame members in a spaced apart relationship;

an aerator in the form of an air pump, said aerator collecting air from the atmosphere and pressurizing said air for delivery to said water contained within said tubular reservoir by way of a flexible hose;

a net pot having a slotted bottom wall for supporting germinated seedlings therein, an open top, and a sidewall with a plurality of slots, a flange extending around said open top, said flange constructed and arranged to support said net pot at said open top end of said vertically collapsible tubular reservoir, said slots sized to allow a plant's roots to grow therethrough, whereby said plant roots can access said water and nutrients in said sealed bottom end of said vertically collapsible tubular reservoir.

8. A self-contained hydroponic plant growing kit comprising:

a vertically collapsible tubular reservoir having an open top end, a side wall, and a sealed bottom end, said side wall including a plurality of accordion pleats for regulating the height of said tubular reservoir, said side wall having a first collapsed position for shipping whereby said side wall is less than half as tall as said side wall in an expanded position, said expanded position for use in said self-contained hydroponic plant growing kit, said sealed bottom end adapted for holding water and nutrients;

an aerator in the form of an air pump, said aerator collecting air from the atmosphere and pressurizing said air for delivery to said water contained within said tubular reservoir by way of a flexible hose;

a net pot having a slotted bottom wall for supporting germinated seedlings therein, an open top, and a sidewall with a plurality of slots, a flange extending around said open top, said flange constructed and arranged to support said net pot at said open top end of said vertically collapsible tubular reservoir, said slots sized to allow a plant's roots to grow therethrough, whereby said plant roots can access said water and nutrients in said sealed bottom end of said vertically tubular collapsible reservoir;

a plurality of plant seeds, at least one plant cube for holding said seeds for germination, and a germination tray, said germination tray having a bottom portion and a translucent top portion, said translucent top portion being securable to said bottom portion, said bottom portion having a cavity sized to contain said at least one plant cube and said plurality of plant seeds.

9. The self-contained hydroponic plant growing kit of claim 8, including a frame assembly sized to support said vertically collapsible tubular reservoir in said expanded position, and a support hanger to suspend said frame assembly and said reservoir from an overhead surface.

10. The self-contained hydroponic plant growing kit of claim 9, wherein said frame assembly includes an upper frame member sized to secure to said open top end of said reservoir and a lower frame member sized to secure to said sealed bottom end of said reservoir.

11. The self-contained hydroponic plant growing kit of claim 10, wherein said upper and lower frame members further include a plurality of apertures, said plurality of apertures are sized for accepting a corresponding number of support dowels, a plurality of support dowels, said support dowels having a length of at least a length of said vertically collapsible tubular reservoir.

12. The self-contained hydroponic plant growing kit of claim 11, wherein each said support dowel includes a top end including a ring and a bottom end having a support member, said ring constructed and arranged for supporting said vertically collapsible tubular reservoir from an overhead surface, said bottom end support member constructed and arranged to support said vertically collapsible tubular reservoir upon a top surface.

13. The self-contained hydroponic plant growing kit of claim 12, including a support hanger, said support hanger having a first end constructed and arranged for attachment to an overhead surface, said support hanger having a second end that is constructed and arranged for attachment to said ring at said top end of each said support dowel.

14. The self-contained hydroponic plant growing kit of claim 13, wherein said second end of said support hanger includes at least one clip member, each said at least one clip member securable to a respective said ring at said top end of each said support dowel.

15. The self-contained hydroponic plant growing kit of claim 11, wherein said plurality of apertures are U-shaped openings, whereby a corresponding said support dowel is sized to slip into the open side of said U-shaped opening.

16. The self-contained hydroponic plant growing kit of claim 15, wherein each said U-shaped opening includes at least one snap-lock feature for engaging a side surface of said support dowel for locking said support dowel within said U-shaped opening.

17. The self-contained hydroponic plant growing kit of claim 11, wherein each said support dowel includes at least one platform support member positioned along the length of each said dowel, each said support member constructed and arranged to cooperate with a said upper or said lower frame member for positioning said frame member with respect to said dowels.

* * * * *